(12) United States Patent
Ho

(10) Patent No.: US 7,777,159 B2
(45) Date of Patent: Aug. 17, 2010

(54) KETTLE CONTROLLER

(75) Inventor: Kin-wah Ho, Guangzhou (CN)

(73) Assignee: Computime, Ltd, Hong Kong (HK)

( * ) Notice: Subject to any disclaimer, the term of this patent is extended or adjusted under 35 U.S.C. 154(b) by 328 days.

(21) Appl. No.: 11/968,420

(22) Filed: Jan. 2, 2008

(65) Prior Publication Data

US 2009/0166350 A1    Jul. 2, 2009

(51) Int. Cl.
*H05B 1/02* (2006.01)

(52) U.S. Cl. .................. 219/441; 219/492; 219/497

(58) Field of Classification Search ............ 219/492, 219/494, 497, 505, 506, 419, 441
See application file for complete search history.

(56) References Cited

U.S. PATENT DOCUMENTS

| | | | |
|---|---|---|---|
| 3,934,118 A | 1/1976 | Jorgenson et al. | |
| 4,375,028 A | 2/1983 | Wood | |
| 4,531,046 A | 7/1985 | Stover | |
| 4,645,910 A | 2/1987 | Chhatwal | |
| 4,853,519 A * | 8/1989 | Tanaka et al. | 219/497 |
| 5,449,884 A * | 9/1995 | Lee | 219/497 |
| 5,901,634 A | 5/1999 | Vancamp et al. | |
| 5,981,916 A * | 11/1999 | Griffiths et al. | 219/492 |
| 6,591,738 B2 * | 7/2003 | Gabriel | 99/336 |
| 6,789,461 B1 | 9/2004 | Huang et al. | |
| 6,818,867 B2 | 11/2004 | Kressmann | |

FOREIGN PATENT DOCUMENTS

| | | |
|---|---|---|
| CN | 1511277 A | 7/2004 |
| CN | 101084400 A | 12/2007 |
| EP | 0380369 A1 | 8/1990 |
| JP | 3-114421 A | 5/1991 |
| JP | 11-137439 A | 5/1999 |
| JP | 2001-46229 A | 2/2001 |
| JP | 3173448 B2 | 6/2001 |

OTHER PUBLICATIONS

International Search Report for PCT/CN2008/073877, dated Apr. 9, 2009, pp. 1-5.

* cited by examiner

*Primary Examiner*—Mark H Paschall
(74) *Attorney, Agent, or Firm*—Banner & Witcoff, Ltd.

(57) ABSTRACT

The present invention provides apparatuses and methods for boiling a liquid such as water. The liquid is heated at full power when the measured temperature of the liquid is below a first predetermined threshold. When the temperature is above the first predetermined threshold and below a second predetermined threshold, partial power, which may be based on the duty cycle, is applied to the heater. When the measured temperature of the liquid reaches the second predetermined threshold, power is removed from the heater after a predetermined time. When the increase of the measured temperature is less than a predetermined temperature change during a predetermined time duration, it is determined that the liquid is boiling and power is removed to the heater. If the level is too high or too low, an alarm may be activated and/or power removed from the heater.

23 Claims, 6 Drawing Sheets

KETTLE CONTROLLER

BACKGROUND OF THE INVENTION

Electric kettles have long been used to heat liquids such as water. Generally, electric kettles include a temperature sensor to measure the temperature of the liquid being heated. Many kettles include a time sensor as well.

One form of thermostat in kettles cuts power to the heating element after the water in the chamber has been brought to boil. A conduit, typically in the form of a copper tube, is provided from a location above the surface of the water in a filled kettle to a location adjacent a thermostat which is adapted to cut power to the element when it senses the high temperature due to the steam.

However, with prior art kettles, the contained liquid may fast boil the liquid when the temperature of the liquid is sufficiently. Consequently, the liquid may spurt out of the kettle, causing injury to the user. It is desirable to provide an efficient way of boiling a liquid that also provides enhanced safety to the user.

SUMMARY OF THE INVENTION

The present invention provides methods and apparatuses for boiling a liquid such as water.

With an aspect of the invention, a liquid is heated at full power when the measured temperature of the liquid is below a first predetermined threshold. When the temperature is above the first predetermined threshold and below a second predetermined threshold, partial power is applied to the heater. When the measured temperature of the liquid reaches the second predetermined threshold, power is removed from the heater after a predetermined time.

With another aspect of the invention, the boiling temperature of the liquid is determined. The first predetermined temperature differs from the boiling temperature by a first temperature difference, and the second predetermined temperature differs from the boiling temperature by a second temperature difference.

With another aspect of the invention, the boiling temperature of the liquid is determined from the altitude of the apparatus and the barometric pressure.

With another aspect of the invention, when an increase of the measured temperature is less than a predetermined temperature change during a predetermined time duration, it is determined that the liquid is boiling and power is removed to the heater.

With another aspect of the invention, the level of the heated liquid is determined. If the level is too high or too low, an alarm is activated and/or power removed from the heater.

With another aspect of the invention, partial power applied to a heater is based on a duty cycle of the applied signal to the heater.

BRIEF DESCRIPTION OF THE DRAWINGS

The foregoing summary of the invention, as well as the following detailed description of exemplary embodiments of the invention, is better understood when read in conjunction with the accompanying drawings, which are included by way of example, and not by way of limitation with regard to the claimed invention.

DETAILED DESCRIPTION

Figure 1:
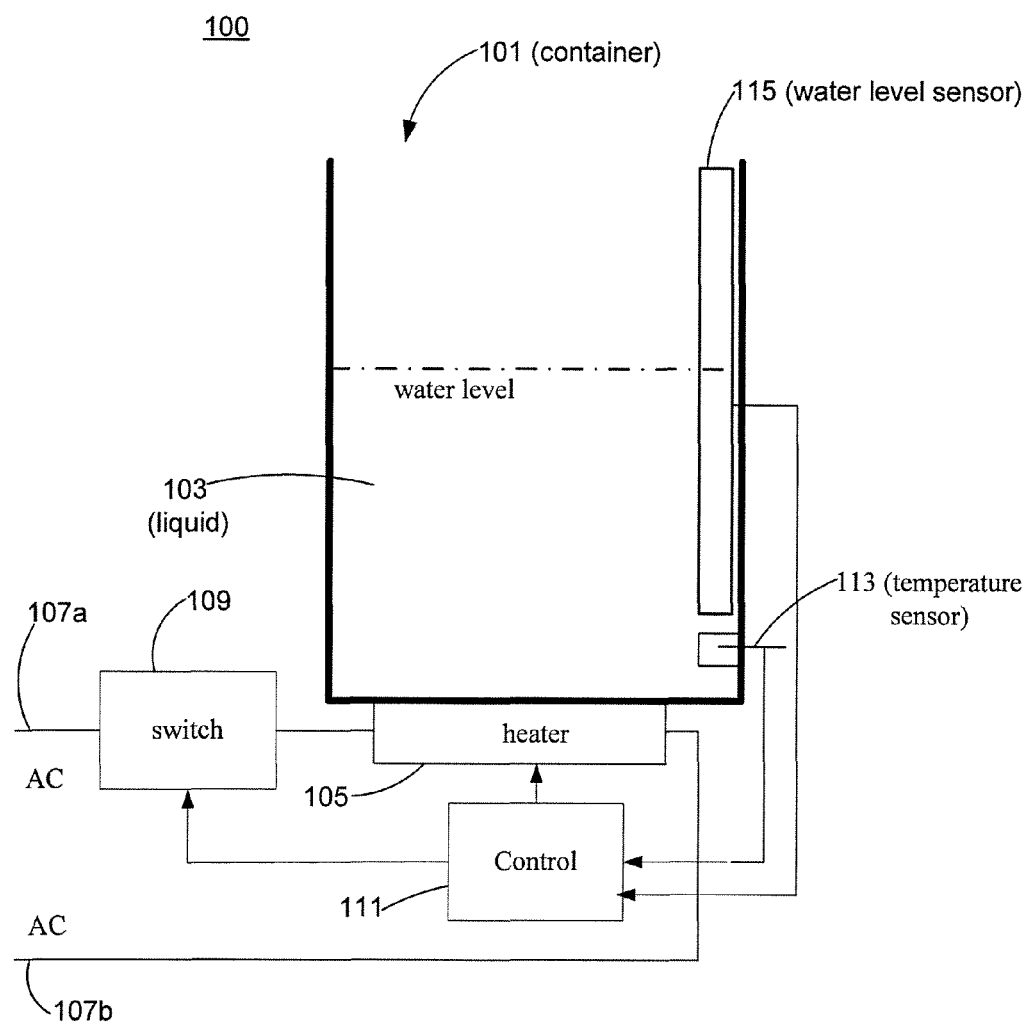
FIG. 1 shows a system for boiling a liquid according to an embodiment of the invention.

FIG. 1 shows system 100 for boiling liquid 103 according to an embodiment of the invention. Heater is provided electrical energy from a signal through inputs 107a, 107b. Container (kettle) 101, which holds liquid 103, is in close proximity to heater 105 so that heat is transferred to liquid 103.

Liquid 103 may comprise different mixtures, e.g., water, a combination of water and coffee, or other chemical compounds. Also, while FIG. 1 shows an alternating current power input (107a, 107b), embodiments of the invention may support different types of power inputs, e.g., three-phase alternating current and direct current.

Controller 111 adjusts the power applied to heater 105 through switch 109 by measuring the temperature of liquid 103 from temperature sensor 113. With an embodiment of the invention, controller 111 controls switch 109 by adjusting the duty cycle of the applied signal 201 as will be discussed.

As will be discussed, controller 111 determines whether the water level is too high or too low from an indicator provided by temperature sensor 113.

Figure 2:
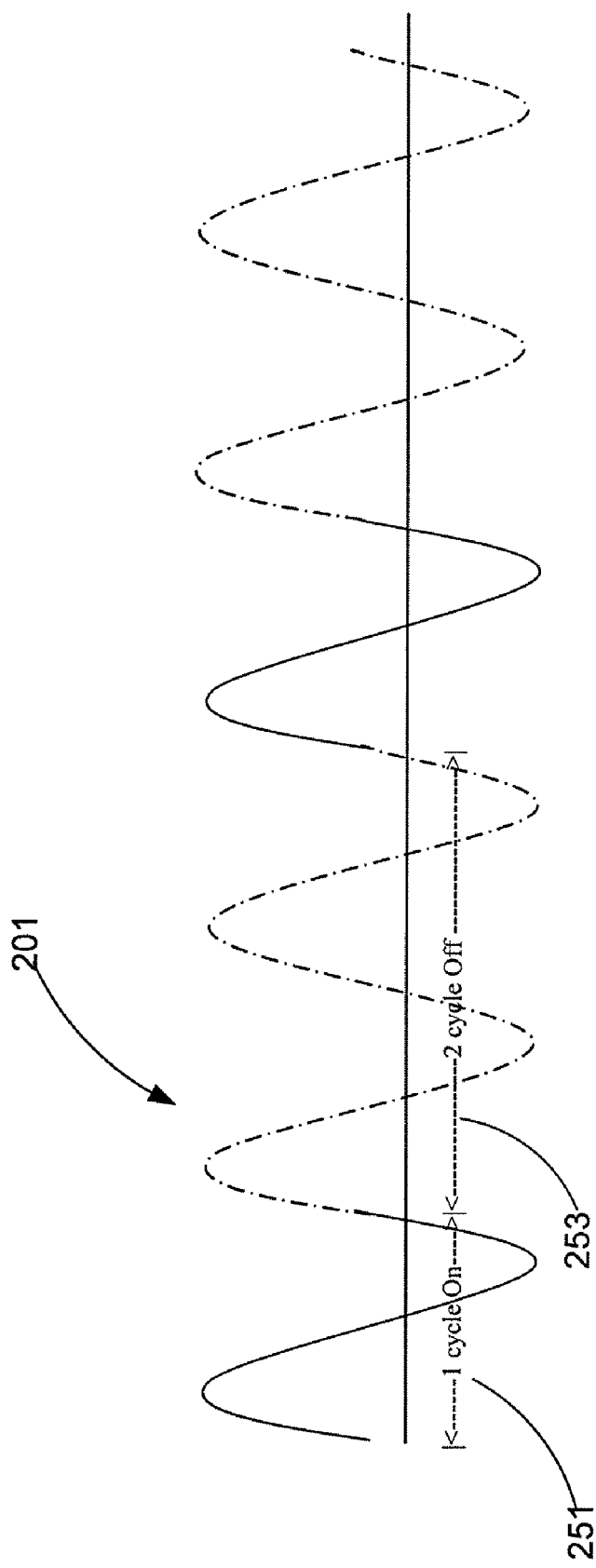
FIG. 2 shows a signal applying power to a heater according to an embodiment of the invention.

FIG. 2 shows an exemplary signal 201 providing power to heater 105 according to an embodiment of the invention. Signal 201 is applied to heater 105 during time duration 251 (one cycle) while signal is removed during subsequent time duration 253 (two cycles). Heater 105 is provided with partial power, where the duty cycle is ⅓. Because the duty cycle is ⅓, the average power supplied to heater 105 is ⅑ of full power.

Each cycle of signal 201 is approximately 16.6 mS for 60 Hz (US) and 20 ms for 50 Hz (Europe, China). According to an embodiment of the invention, the average voltage $V_s$ applied to heater is:

$$V_s = NV_f \tag{EQ. 1}$$

the full power ($P_f$) is:

$$P_f = V_f^2/R \tag{EQ. 2}$$

and the slow boiling power $P_s$ is equal to:

$$P_s = N^2 P_f \tag{EQ. 3}$$

where N is the duty cycle (on time/(on time+off time), $V_f$ is the input voltage, and R is the resistance equivalent of heater 105.

With an embodiment of the invention, the slow boiling power (partial power) ranges from 300-1000 W (corresponding to a duty cycle (N) between ⅓ and ½) when boiling water. The partial power rate is determined by water level and kettle characteristics e.g., low water level or narrow hatch kettle may use a high rate power 700-1200 W but high water level or big hatch kettle may use a low rate power 300-600 W. A range from 500 to 1000 W is a typical slow boiling power range.

Figure 3:
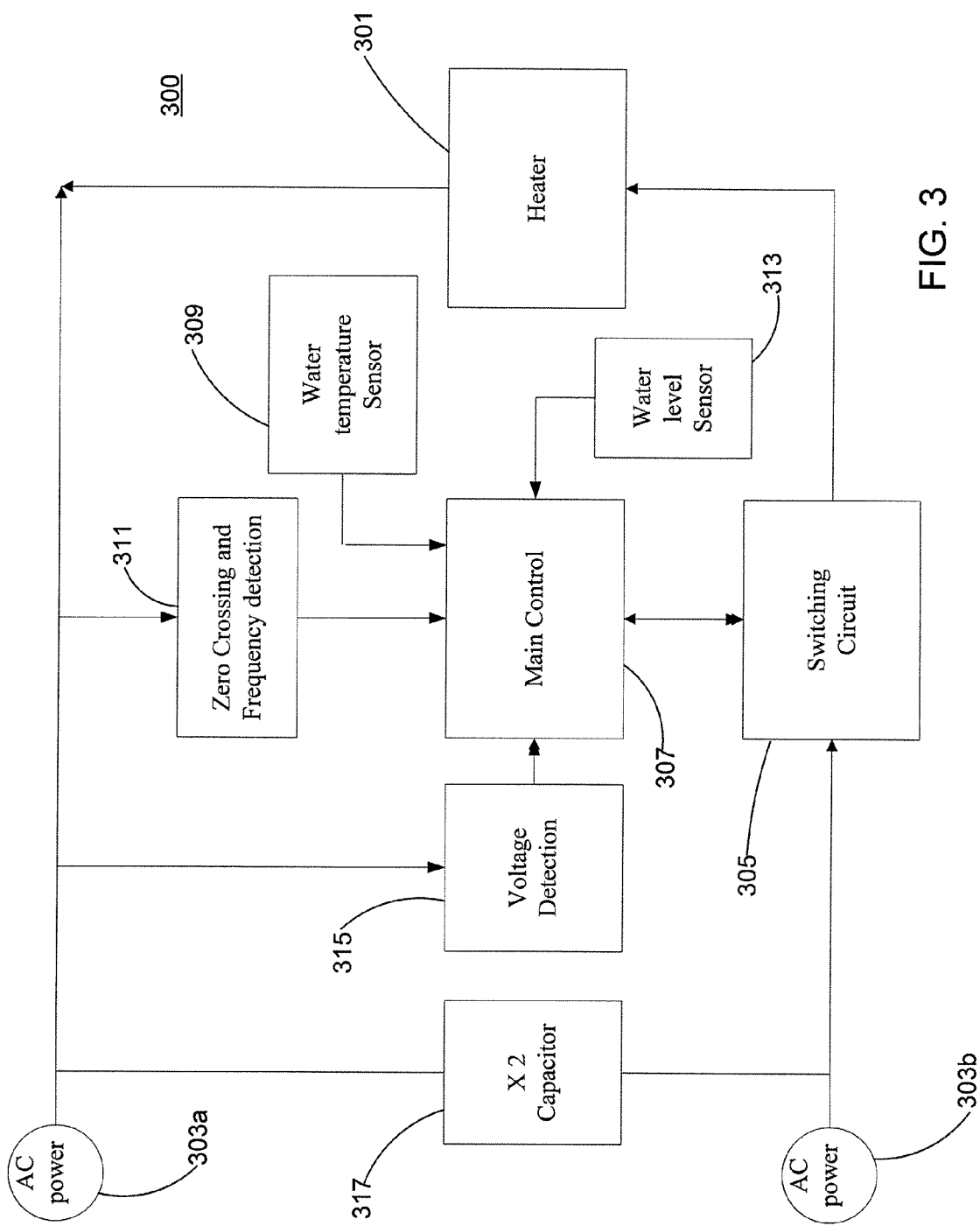
FIG. 3 shows an apparatus for boiling a liquid according to an embodiment of the invention.

FIG. 3 shows apparatus 300 for boiling a liquid in a container (not shown) according to an embodiment of the invention. Heater 301 is provided power by a signal through inputs 303a, 303b and switching circuit 305. Switching circuit 305 may be implemented in a number of ways. For example, switching circuit 305 may comprise a triac that is turned on and off by main control circuit 307 in accordance with a desired duty cycle. (A triac is a three terminal semiconductor for controlling current in either direction.) With full power being applied to heater 301, switching circuit 305 continuously conducts (i.e., the duty cycle is 1). If the duty cycle is ⅓ (corresponding to partial power), then switching circuit 305 may repetitively turn on for one cycle and turn off for two cycles as shown in FIG. 2. If the duty cycle is ½, then switching circuit 305 may turn on for one cycle and turn off for one cycle.

As will be further discussed, main control circuit 307 determines the duty cycle from temperature sensor 309 and synchronizes switching circuit 305 turning on and off with the zero crossings of the voltage of input signal 201. Main control circuit 307 determines the zero crossings from zero crossing/frequency detector 311. Detector 311 is able to detect zero crossings even though the frequency of input signal 201 may vary, e.g., 60 Hz for the US and 50 Hz for Europe.

Voltage detection circuit 315 measures the voltage level of input signal 201 so that main control circuit 307 can determine the full power ($P_f$) in accordance with EQ. 2. The value of the full power is dependent on the characteristics of the kettle. As an example, typically 2 kW to 3 kW is applied to heater 301 when main control circuit 307 determines that full power should be applied, typically when the temperature of the liquid, as measured by temperature sensor 309, is below a predetermined temperature. The predetermined temperature is dependent on the characteristics of the liquid and on environmental factors (e.g., altitude and barometric pressure).

If full power were applied to heater 301 when the liquid temperature is above the predetermined temperature (e.g., 95° C. at sea level), the water may bubble excessively and spurt out of the kettle. Consequently, when the liquid temperature is above the predetermined temperature, main control circuit 307 reduces the applied power to heater 301 to partial power ($P_f$), as given by EQ. 3. Typically, N is equal to ⅓ to ½. With partial power, bubbling of the water is reduced, preventing the water from spurting out and harming the user.

Level sensor 313 provides an indicator of the level of the liquid to main control 307. If the liquid level is too low, the kettle may overheat, causing damage to the kettle and possibly starting a fire. If the liquid level is too high, the liquid may overflow the kettle and cause hot vapor to injure the user. Consequently, when main control circuit 307 detects the liquid level as being too low or too high, main control circuit 307 removes power from heater 301 and/or activates an alarm.

Capacitor 317 filters noise from switching circuit 305 in order to reduce electromagnetic interference. For example, capacitor 317 may comprise a X2 capacitor to filter triac switching noise in order to pass electromagnetic compatibility tests. (An X capacitor is a RFI capacitor used in positions where if failed would not be hazardous to anyone who touches the case of the equipment. The X capacitors are connected across the line conductors. There are three sub-classes of X capacitors: X1, X2 and X3. The most common is X2 sub-class, used for IEC-664 Installation Category II. The X2 capacitors are rated for peak pulse voltage in service of less or equal to 2.5 KV.) The value of capacitor 317 may be determined by:

$$C_{x2}=0.03 \sim 0.055I(\text{uF}) \quad \text{(EQ. 5)}$$

where I is the full power current. For example, when full power is 3000 W/240V, I=12.5 A and $C_{x2}$=0.375(0.47 uF) ~0.68 uF.

Figure 4:
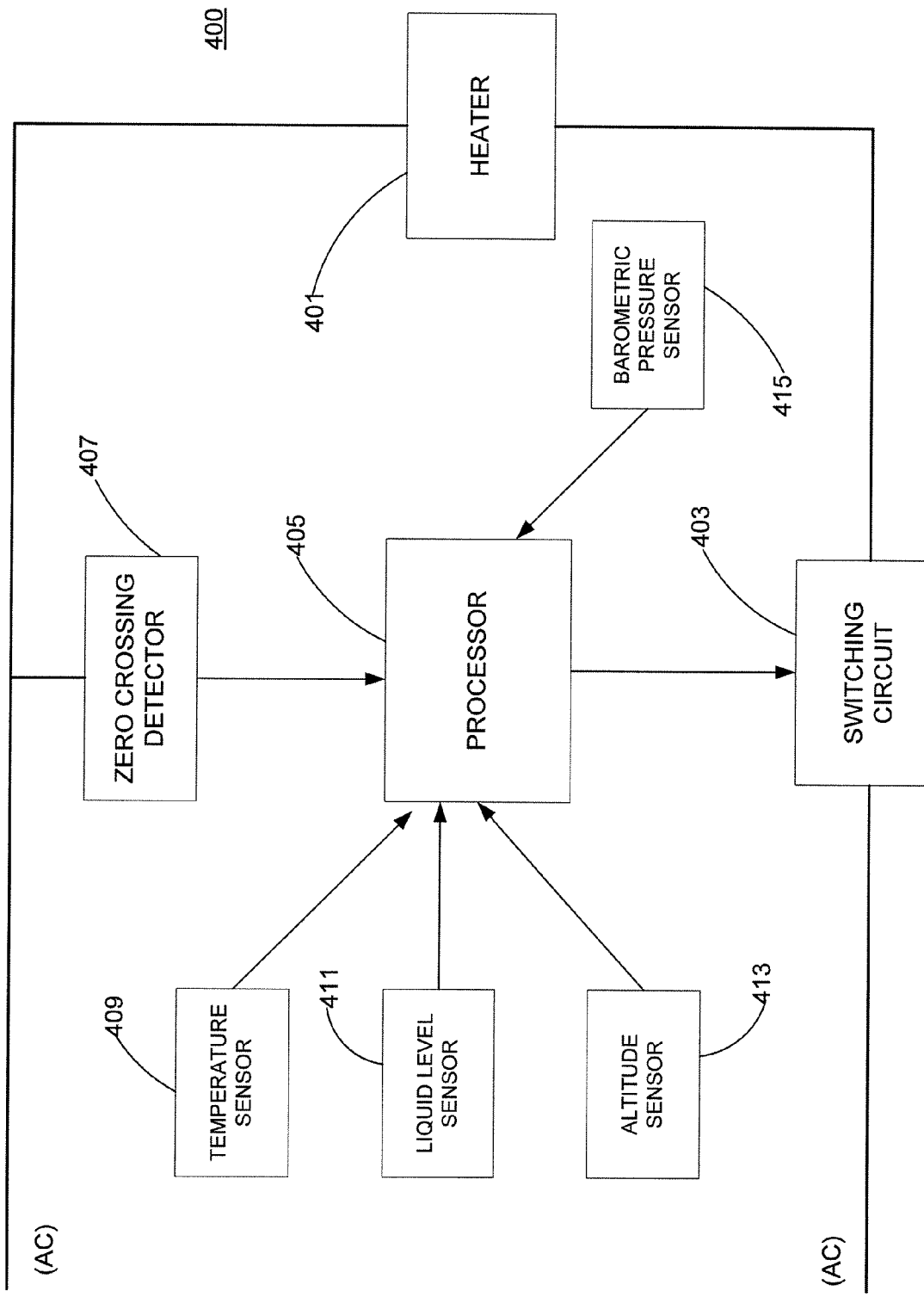
FIG. 4 shows an apparatus for boiling a liquid according to an embodiment of the invention.

FIG. 4 shows apparatus 400 for boiling a liquid according to an embodiment of the invention. Heater 401 heats liquid in a container (not shown) when power is applied by a input signal passing through switching circuit 403. Processor 405 determines duty cycle N from information provided by temperature sensor 409, altitude sensor 413, and barometric pressure sensor 415. (In contrast to apparatus 300, apparatus 400 directly determines the boiling temperature of the heated liquid.) Consequently, the boiling temperature ($T_b$) of the liquid, which is a function of the altitude and the barometric pressure, may be determined by processor 405 from a look-up table or from a mathematical relationship. The table that is later presented shows some examples of the boiling temperature of water as a function, of the altitude and barometric pressure.

As previously discussed, when the measured liquid temperature is below a predetermined temperature, switching circuit 403 (as instructed by processor 405) applies full power to heater 401. When the measured liquid temperature is above or equal to the predetermined temperature, partial power is applied to heater 401.

Processor 405 instructs switching circuit 403 to switch at zero crossings as determined by zero crossing detector 407 in accordance with the determined duty cycle. As previously discussed, processor 405 instructs switching circuit 403 to remove applied power to heater 401 when the level of the liquid in the container is too low or too high as determined by level sensor 411.

Figure 5:
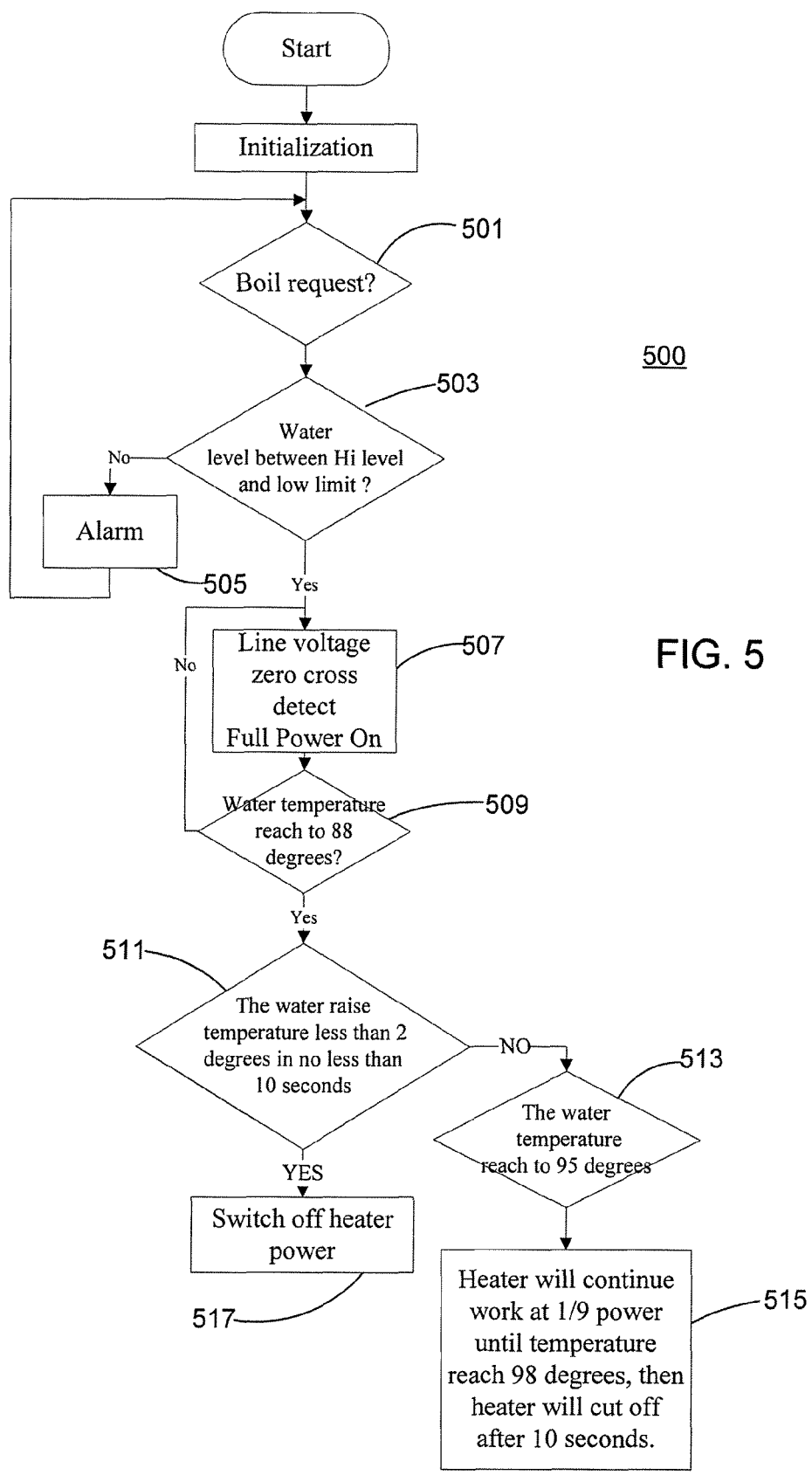
FIG. 5 shows a flow diagram in which a liquid is boiled according to an embodiment of the invention.

FIG. 5 shows flow diagram 500 in which a liquid is boiled according to an embodiment of the invention. While embodiments of the invention can boil different types of liquids, flow diagram 500 illustrates the boiling of water. If user requests to boil a liquid in step 501, processor 307 determines whether the liquid level is too high or too low in step 503. If so, an alarm is activated to inform the user in step 505. In addition, power may be removed from heater 301.

In step 507, apparatus 300 applies full power to heater 301 or 401 in synchronism with the zero crossings of input signal 201. Because apparatuses 300 and 400 can operate at different altitudes, the boiling temperature of water may vary (e.g., 100° C. at sea level, 95° C. at 5000 feet, and 89° C. at 10000 feet). Consequently, the heated water can boil at a temperature substantially below the boiling temperature at sea level (100° C.).

In step 509, processor 307 determines if the measured temperature of the heated water is 88° C. or greater. If so, the water may boil at a temperature less than 100° C. depending on the altitude and the barometric pressure. (For example, distilled water in Denver, Colo. boils at 93° C. at a barometric pressure of 29 inches HG. At higher elevations (e.g. La Paz, Bolivia), the boiling temperature is even lower.) In step 511, if the measured temperature of the heated water rises less than a predetermined temperature change (e.g., 2° C.) during a predetermined time duration (e.g., at least 10 seconds), then process 500 deems that the water is boiling and turns off the heater in step 517. (A liquid generally cannot be heated to a temperature above its boiling point. Upon reaching the boiling temperature, a phase transition takes place and all energy is utilized to convert the liquid into gas rather than to heat the liquid.)

If apparatus 300 deems that the heated water is not boiling and that the measured temperature is above 95° C. (first predetermined temperature) in step 513, then partial power is applied to heater 301 in step 515. In the exemplary embodiment, the partial power is ⅓ of full power because the duty cycle is ⅓.) Heater 301 continues to heat the water with partial power until the measured temperature reaches a second predetermined temperature (e.g., 98° C. for water). When the measured temperature is approximately equal to the second predetermined temperature, heater 301 is turned off after a predetermined time (e.g., 10 seconds) so that the liquid reaches a boiling temperature. Experimental results suggest that the water temperature typically increases from 98° C. increase to 100° C. within a 10-second duration.

Figure 6:
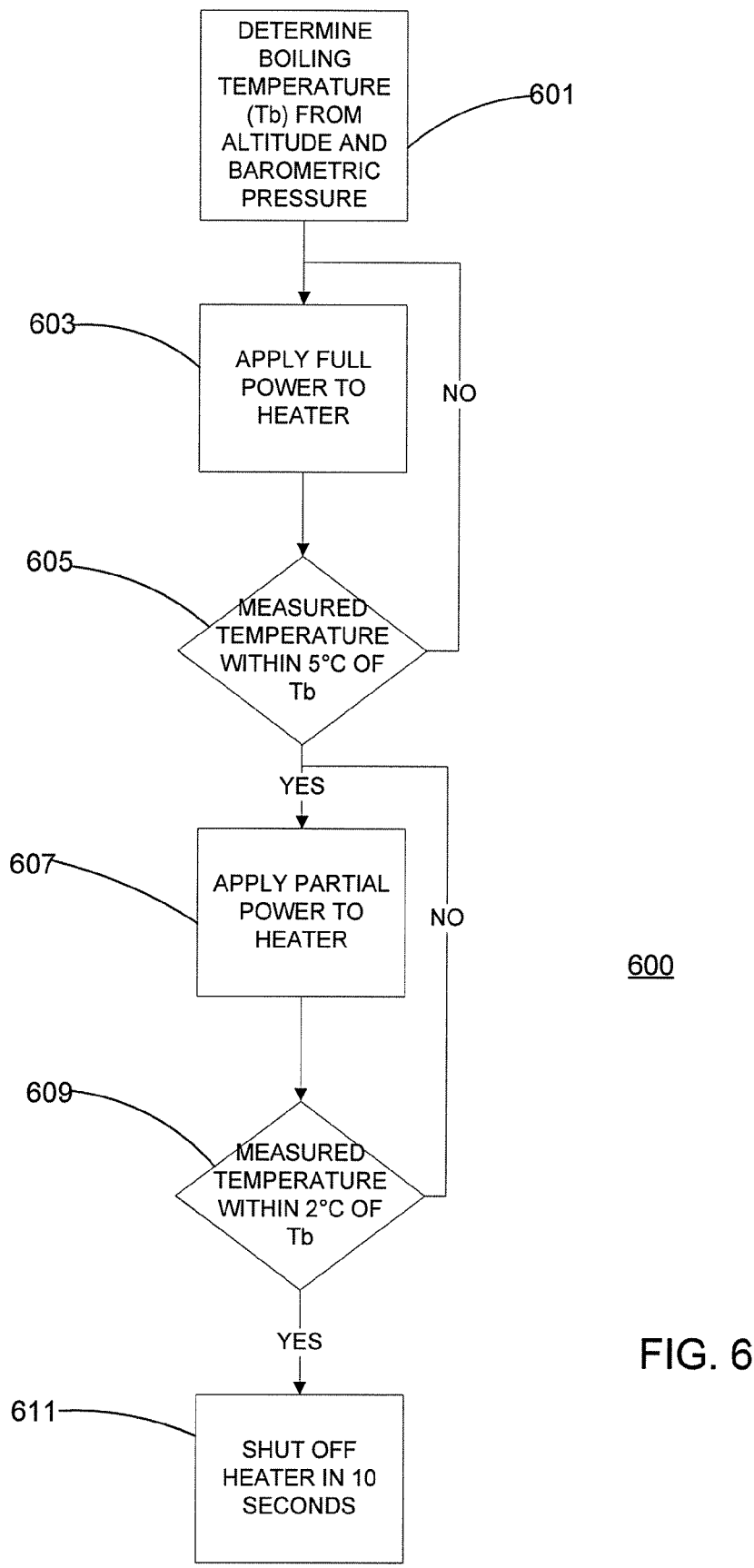
FIG. 6 shows a flow diagram in which a liquid is boiled according to an embodiment of the invention.

FIG. 6 shows flow diagram 600 in which a liquid is boiled by apparatus 400 according to an embodiment of the invention. In step 601, the boiling temperature ($T_b$) of the liquid is determined from the type of liquid (e.g., distilled water), the altitude, and the barometric pressure of apparatus 400. The following table provides examples of the boiling temperature of water as a function of the altitude and barometric pressure.

TABLE

Boiling Temperature of Water

| City | Altitude (feet) | Barometric Pressure (millibars) | Boiling Temperature ($T_B$) (° C.) |
|---|---|---|---|
| New York | 13 | 982 (29 inches HG) | 99.1 |
| Chicago | 619 | 982 | 98.5 |
| Denver | 5883 | 982 | 93.0 |
| New York | 13 | 1015 (30 inches HG) | 100.0 |
| Chicago | 619 | 1015 | 99.5 |
| Denver | 5883 | 1015 | 94.0 |

In step 603, the liquid is heated at full power until the measured temperature is within 5° C. of boiling temperature of the liquid as determined by step 605. (For example, if the liquid is water at sea level, the corresponding temperature is 95° C.) Subsequently, partial power is applied to heater 401 in step 607 until the measured temperature of the liquid is within 2° C. of the boiling temperature as determined by step 609. (For example, if the liquid is water at sea level, the corresponding temperature is 98° C.) Subsequently, the heater is turned off after a predetermined time (e.g., 10 seconds).

As can be appreciated by one skilled in the art, a computer system with an associated computer-readable medium containing instructions for controlling the computer system can be utilized to implement the exemplary embodiments that are disclosed herein. The computer system may include at least one computer such as a microprocessor, digital signal processor, and associated peripheral electronic circuitry.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus comprising:
a heater configured to heat a liquid from a power source, wherein the liquid is contained in a container;
a temperature sensor configured to measure a temperature of the liquid to obtain a measured temperature;
a switching circuit coupled to the heater for controlling the power source that is coupled to the heater;
a processor configured to perform:
configuring the switching circuit to apply full power to the heater when the measured temperature is below a first predetermined temperature;
configuring the switching circuit to apply partial power to the heater when the measured temperature is below a second predetermined temperature and above the first determined threshold, wherein the second predetermined temperature is less than a boiling temperature of the liquid; and
removing power to the heater after a first predetermined time when the measured temperature is approximately equal to the second predetermined temperature, wherein the liquid reaches the boiling temperature within the first predetermined time.

2. The apparatus of claim 1, wherein the processor is further configured to perform:
determining the boiling temperature of the liquid,
wherein the first predetermined temperature differs from the boiling temperature by a first temperature difference, and
wherein the second predetermined temperature differs from the boiling temperature by a second temperature difference.

3. The apparatus of claim 2, further comprising:
an altitude sensor,
wherein the processor is further configured to perform:
obtaining an altitude of the container from the altitude sensor; and
determining the boiling temperature of the liquid from the altitude.

4. The apparatus of claim 1, wherein the processor is further configured to perform:
when an increase of the measured temperature is less than a predetermined temperature change during a predetermined time duration, determining that the liquid is boiling and removing power to the heater.

5. The apparatus of claim 1, further comprising:
a capacitor across the power source,
wherein the switching circuit comprises a triac.

6. The apparatus of claim 1, wherein the liquid comprises water.

7. The apparatus of claim 1, further comprising:
a liquid level sensor configured to determine a level of the liquid in the container,
wherein the processor is further configured to perform:
obtain a level indicator from the liquid level sensor;
when the level indicator is greater than a predetermined high level, removing power from the heater; and
when the level indicator is less than a predetermined low level, removing power from the heater.

8. The apparatus of claim 1, wherein the processor is further configured to perform:
adjusting the partial power based on a duty cycle of an applied signal to the heater.

9. The apparatus of claim 8, wherein the processor is further configured to perform:
adjusting the full power and the partial power from a measured voltage of the power source.

10. The apparatus of claim 8, further comprising;
a liquid level sensor,
wherein the processor is further configured to perform:
obtaining a level indicator from the liquid level sensor, wherein the level indicator is indicative of a level of the liquid; and
removing power to the heater when the level is sufficiently high or sufficiently low.

11. A method comprising:
measuring a temperature of a liquid, wherein the liquid is contained in a container; and
heating the liquid with a heater by:
applying full power to the heater when the measured temperature is below a first predetermined temperature;

applying partial power to the heater when the measured temperature is below a second predetermined temperature and above the first predetermined threshold; and removing power to the heater after a first predetermined time when the measured temperature is approximately equal to the second predetermined temperature, wherein the second predetermined temperature is less than a boiling temperature of the liquid, wherein the liquid reaches the boiling temperature within the first predetermined time.

12. The method of claim 11, further comprising:
determining the boiling temperature of the liquid, wherein:
   the first predetermined temperature differs from the boiling temperature by a first temperature difference, and
   the second predetermined temperature differs from the boiling temperature by a second temperature difference.

13. The method of claim 12, further comprising:
obtaining an altitude of the container; and
determining the boiling temperature of the liquid from the altitude.

14. The method of 11, further comprising:
when an increase of the measured temperature is less than a predetermined temperature change during a predetermined time duration, determining that the liquid is boiling and removing power to the heater.

15. The method of claim 11, wherein the liquid comprises water.

16. The method of claim 15, wherein:
the first predetermined temperature equals approximately 95 degrees C.; and
the second predetermined temperature equals approximately 98 degrees C.

17. The method of claim 11, further comprising:
obtaining a level indicator from the liquid level sensor;
when the level indicator is greater than a predetermined high level, removing power from the heater; and
when the level indicator is less than a predetermined low level, removing power from the heater.

18. The method of claim 11, further comprising:
adjusting the partial power based on a duty cycle of applied power from a power source.

19. The method of claim 13, further comprising:
obtaining a barometric pressure; and
determining the boiling temperature of the liquid from the altitude and the barometric pressure.

20. The method of claim 11, further comprising:
determining the partial power from a characteristic of the container.

21. The method of claim 11, further comprising:
determining the partial power from a level of the liquid.

22. An apparatus comprising:
a heater configured to heat water from a power source, wherein the water is contained in a container;
a temperature sensor configured to measure a temperature of the water to obtain a measured temperature;
a switching circuit coupled to the heater for controlling the power source that is coupled to the heater;
a processor configured to perform:
   configuring the switching circuit to apply full power to the heater when the measured temperature is below approximately 95 degrees C.;
   configuring the switching circuit to apply partial power to the heater when the measured temperature is below approximately 98 degrees C. and above approximately 95 degrees C.; and
   removing power to the heater after a predetermined time when the measured temperature is approximately equal to 98 degrees C., wherein the water reaches approximately 100 degrees C. within the first predetermined time.

23. The apparatus of claim 22, wherein the processor is further configured to perform:
when an increase of the measured temperature is less than 2 degrees C. for at least 10 seconds, determining that the water is boiling and removing power to the heater.

* * * * *